(12) United States Patent
Chakraborty

(10) Patent No.: US 8,760,683 B2
(45) Date of Patent: Jun. 24, 2014

(54) TECHNIQUES FOR SCHEDULING AND GUARANTEEING PRINT JOBS

(75) Inventor: Ruma Chakraborty, Kolkata (IN)

(73) Assignee: Novell, Inc., Provo, UT (US)

( * ) Notice: Subject to any disclaimer, the term of this patent is extended or adjusted under 35 U.S.C. 154(b) by 778 days.

(21) Appl. No.: 12/413,708

(22) Filed: Mar. 30, 2009

(65) Prior Publication Data

US 2010/0245890 A1  Sep. 30, 2010

(51) Int. Cl.
*G06F 3/12* (2006.01)

(52) U.S. Cl.
USPC ........ 358/1.15; 358/1.14; 358/1.13; 345/156; 345/173; 700/100; 700/103

(58) Field of Classification Search
CPC ..... G06F 3/126; G06F 3/1275; G06F 3/1263; G06F 9/4881; G06Q 10/0631; H04N 1/00954; H04N 1/00915; H04N 2201/3214
USPC ............... 358/1.14, 1.15, 1.13; 345/156, 173; 700/100, 103
See application file for complete search history.

(56) References Cited

U.S. PATENT DOCUMENTS

| | | | |
|---|---|---|---|
| 6,385,728 B1 | 5/2002 | DeBry | |
| 6,606,163 B1 | 8/2003 | Suzuki et al. | |
| 6,850,336 B1 | 2/2005 | Purvis et al. | |
| 7,084,997 B2 | 8/2006 | Clough | |
| 7,148,991 B2 | 12/2006 | Suzuki et al. | |
| 7,224,913 B2 | 5/2007 | Richards | |
| 7,385,720 B2 | 6/2008 | Bhatti | |
| 7,505,166 B2 | 3/2009 | Han | |
| 2002/0071540 A1* | 6/2002 | Dworkin | 379/202.01 |
| 2003/0011811 A1* | 1/2003 | Clough | 358/1.15 |
| 2003/0086115 A1* | 5/2003 | Bhatti | 358/1.15 |
| 2006/0044612 A1* | 3/2006 | Kayama | 358/1.15 |
| 2008/0144081 A1 | 6/2008 | Morales et al. | |
| 2010/0110478 A1* | 5/2010 | Mathur et al. | 358/1.15 |
| 2010/0238484 A1* | 9/2010 | Komine | 358/1.15 |

FOREIGN PATENT DOCUMENTS

EP  1096364 A2  5/2001

* cited by examiner

*Primary Examiner* — Jacky X Zheng
(74) *Attorney, Agent, or Firm* — Schewgman, Lundberg & Woessner, P.A.

(57) ABSTRACT

Techniques for scheduling and guaranteeing print jobs are presented. Print jobs are scheduled to process on a selected printer at user-defined dates and times. A print queue for the selected printer is managed to ensure that no subsequent print job begins on the printer when that subsequent print job cannot finish before a scheduled start time of a scheduled print job that has been guaranteed the scheduled start time on the printer.

8 Claims, 3 Drawing Sheets

TECHNIQUES FOR SCHEDULING AND GUARANTEEING PRINT JOBS

BACKGROUND

Computing and communication have become exercises that are largely independent of geography, network wires, and device limitations. That is, computing devices have become smaller, more powerful, and more power efficient. Similarly, wireless communication networks have been migrating to 3G speed providing wireless high-speed access to the Internet from virtually anywhere on the globe.

Even with these improvements, individuals often still find it necessary to meet occasionally in person and to present information and materials in print format. So, the need for printing information has not substantially waned as was originally expected or anticipated. As a result, the ability to print to any place at any time has not experienced any significant breakthroughs even with the advancements in other technological areas.

Accordingly, what typically happens when an individual wants to print a presentation out for a remote site is that the individual physically travels to the remote site and hooks into the printer network to print that presentation or that individual emails the presentation to a user at the remote site and requests that the user print the presentation out. The individual who wants to print the presentation has no real independence in this exercise and is forced to rely on other resources to assist him/her in accomplishing the print job in a timely and location-specific manner.

Moreover, even if the individual can schedule a print job for execution at a later date and time there is still no assurances that the print job will complete on time because other more important or even less important print jobs may bump the desired print job from its location in a print queue thereby delaying a scheduled start time for the print job. Also, the desired print job may be quite large and may take more time than the individual originally believed that it would, such that even if the print job does print on schedule it may not complete in time for the individual's meeting.

Thus, what are needed are improved techniques for scheduling and guaranteeing print jobs.

SUMMARY

In various embodiments, techniques for scheduling and guaranteeing print jobs are presented. More specifically, and in an embodiment, a method is provided for scheduling a print job. A print job request is received with print data from a requestor. A future date and time requested for the print job request is identified, the future date and time requested is made by the requestor. Next, the requestor is assured that the print job request is to execute on the future date and time after successful inspection of a schedule for existing print job requests.

DETAILED DESCRIPTION

As used herein a "resource" is an addressable and uniquely distinguishable entity, which is represented within a network, such as but not limited to, a user, a service, a group, a printer, a server, a website, a domain, a device, custom-defined objects, etc.

Various aspects of this invention discuss usage of a "print job." A "print job" is a request made to have information (print data) physically transferred from an electronic environment to a tangible print medium. This is achieved via a printer that uses inks or thermal imaging technology to cause images and text to be visible on physical print media (such as paper). The print job includes transforming the print data that is to be printed into a print format (such as raster images) that a print driver uses to cause the ink jets, lasers, or thermal print heads to selectively activate and print the information onto the print media.

As used herein a "calendar" is an electronic data structure that is processed by a "calendar system" or "calendar application" and includes dates and times for a particular resource. That is, each resource includes its own calendar and each day (date) of the calendar includes calendar entries representing specific times during a specific day (date). In various embodiments presented herein and below, the resource is a printer and a printer at a particular geographic facility. So, each printer at a specific geographic location has its own calendar, the calendar entries of which representing scheduled print jobs that are to be executed on that printer. The printer's calendar is managed electronically by software that executes on processors, which are configured to perform the techniques described herein and below.

According to an embodiment, the techniques presented herein are implemented in eDirectory®, email products, and/or proxy-based products that are distributed by Novell®, Inc. of Provo, Utah. Also, in some embodiments, the Operating System (OS) is Linux, such as Suse® Linux, distributed by Novell®, Inc. of Provo, Utah.

Of course, the embodiments of the invention can be implemented in a variety of architectural platforms and products. Any particular architectural layout, product, or implementation presented herein is provided for purposes of illustration and comprehension only and is not intended to limit various aspects of the invention.

It is within this initial context, that various embodiments of the invention are now presented with reference to the FIGS. 1-4.

Figure 1:
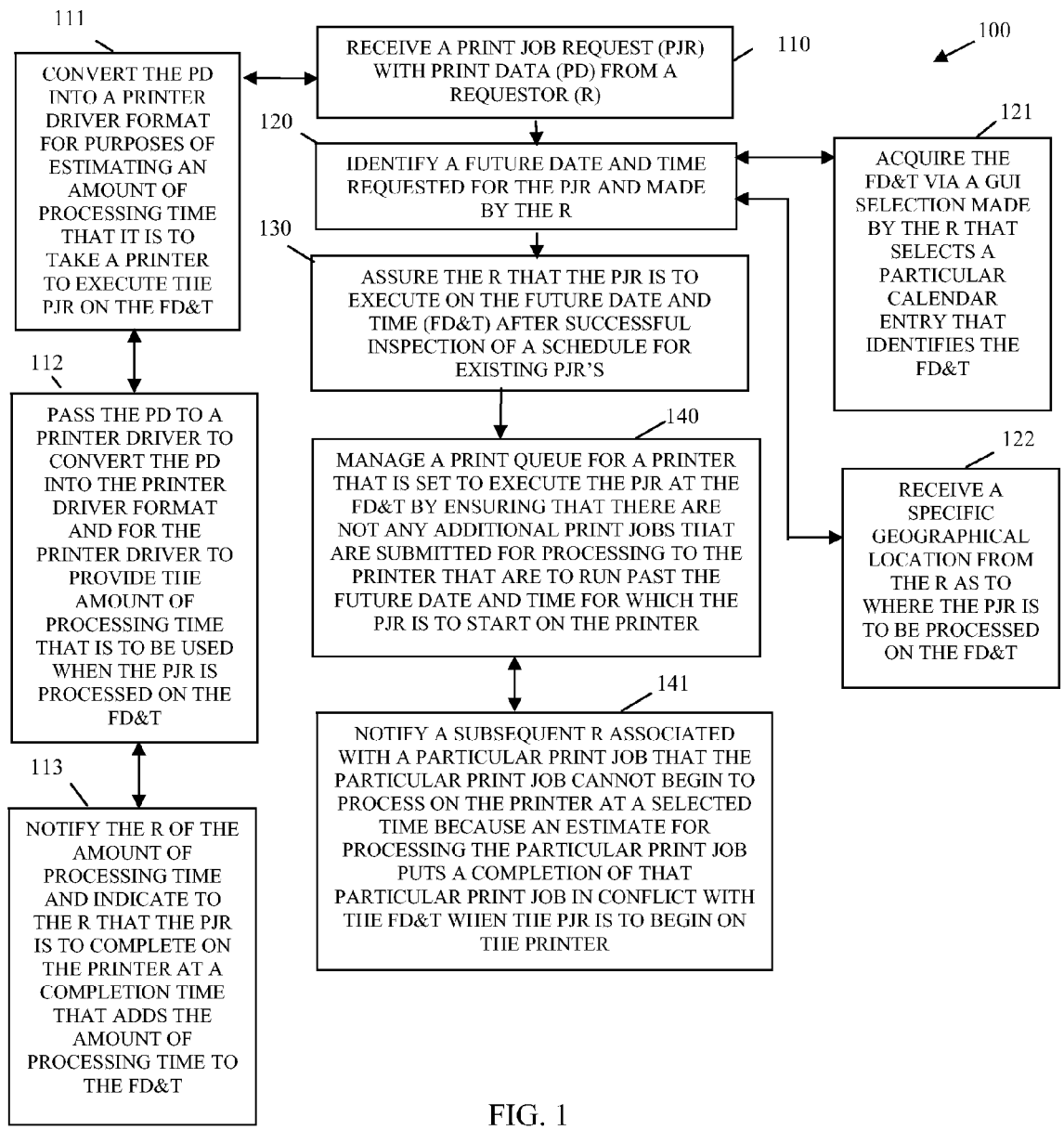
FIG. 1 is a diagram of a method that is provided for scheduling a print job, according to an example embodiment.

FIG. 1 is a diagram of a method 100 that is provided for scheduling a print job, according to an example embodiment. The method 100 (hereinafter "print scheduler") is implemented as instructions in a machine-accessible and computer-readable storage medium. The instructions when executed by one or more network-based machines (processing devices, processors, computers, etc.) perform the processing depicted in FIG. 1. The print scheduler is also operational over and processes within a network. The network may be wired, wireless, or a combination of wired and wireless.

The print scheduler is implemented on a network node, such as a print server in a client-server architecture and is accessible over the network, such as the Internet.

At 110, the print scheduler receives a print job request with print data from a requestor. That is, a requestor, such as a user, desires to print information (print data) from an electronic medium to print media (such as paper, etc.). To achieve this, the requestor makes or causes to generate a print job request for the print data and this print job request is received by the print scheduler for processing. It is noted that in some embodiments, the requestor can be an automated program or service that interacts in an automated fashion with the print scheduler. So, the requestor can be a user in some embodiments and an automated service in other embodiments.

According to an embodiment, at 111, the print scheduler converts the print data (information that is to be printed with the print job request) into a printer driver format. This is done for purposes of estimating an amount of processing time that it is going to take a printer to execute and complete the print job request on a future date and time (discussed below with reference to the processing at 120).

Continuing with the embodiment at 111 and at 112, the print scheduler passes the print data to a printer driver. The printer driver performs the conversion of the print data into the printer driver format (such as raster images). Once the printer driver has the size and complexity of the printer driver formatted print data, the printer driver can use estimation algorithms to provide an estimate that represents the amount of processing time that the printer is going to need to complete the print job request when the printer actually prints the print data. Any existing estimation algorithm can be used to provide the estimate and such algorithm is typically provided via an enhanced version of a printer driver.

Again continuing with the embodiment at 112 and at 113, the print scheduler notifies the requestor of the amount of processing time that is estimated for the print job request when that print job request is executed. The print scheduler also indicates to the requestor that the print job request is to complete on the printer at a completion time represented by the future date and time plus the amount of estimated processing time for the print job request to print on the printer. So, as an example, if the future date is Monday Jan. 1, 2010 and the future time is 10 am and the amount of estimated processing time is 1 hour, then the print scheduler informs the requestor that the completion time for the print job request is Monday Jan. 1, 2010 at 11 am.

At 120, the print scheduler identifies a future date and time requested for the print job request. The future date and time is made or selected by the requestor with the print job request. It is noted that the future date and time is a day and time-of-day that is different from when the print job request was made by the requestor. So, the future date and time has not occurred and has yet to occur when identified by the print scheduler.

In an embodiment, at 121, the print scheduler acquires the future date and time via a Graphical User Interface (GUI) selection that is made by the requestor when that requestor selects a particular calendar entry of a calendar being maintained for the printer, which is to print the print job request on the future date and time. The requestor-selected calendar entry identifies the future date and time for the print scheduler.

In another situation, at 122, the print scheduler receives a specific geographical location from the requestor as to where the print job request is to be processed on the future date and time. So, a pool of printers may be available and printing calendars or schedules may be solely based on whatever printer is available at a given future date and time at the designated geographical location.

With the embodiment at 121, the calendar is maintained by printer whereas in the embodiment at 122 the calendar is maintained by geographical location. It is noted that the calendar or print schedule can be maintained based on both a specific printer and specific geographical location.

At 130, the print scheduler assures the requestor that the print job request is to execute on the future date and time after successful inspection of a schedule for existing print job requests. So, the print scheduler determines from the schedule for a printer or a geographical location what print jobs are set to print on what dates and times and in view of this can decide in an automated fashion whether the print job request made by the requestor can be presently satisfied by the print scheduler. If the schedule does permit the print job request printing on the scheduled future date and time, then the print scheduler subsequently ensures that nothing interferes with this scheduled processing of the print job request. Essentially, the print scheduler guarantees that the print job request will take place on the future date and time.

So, according to an embodiment, at 140, the print scheduler manages a print queue for a printer that is set to execute the print job request at the future date and time. This is done by the print scheduler ensuring that there are not any additional print jobs that are submitted for processing to the printer that are to run past the future date and time for which the print job request is to start on the printer. For example, suppose with the previously presented example that at 9:55 am on Jan. 1, 2010 a print job request is made to the printer and that print job request is to take 10 minutes such that it will end and free the printer up at 10:05 am. However, the original print job request was set to print at 10 am on Jan. 1, 2010; so, in view of this the print scheduler would not allow the request received at 9:55 am to execute on the printer. This means that when the original print job request for 10 am on Jan. 1, 2010 was received that requestor received an assurance from the print scheduler that the print job request would process at 10 am and should any intervening job be received that can interfere with that assurance, the intervening job will not be permitted to interfere. This is a form of a guarantee as best a guarantee can be made, since it is clear that an absolute guarantee is not reasonable because the printer itself may fail for a variety of reasons on the future date and time, such as because it is unplugged, out of ink, etc. But, the print scheduler does guarantee that the printer's print queue will not accept any print job that will interfere with the print job request and its schedule once the print scheduler has assured the requestor of this fact.

Continuing with the embodiment at 140 and at 141, the print scheduler notifies any subsequent requestor, who is associated with a particular print job, that the particular print job cannot begin to process on the printer at a selected time because an estimate for processing that particular print job puts completion of the particular print job in conflict with the future date and time for when the print job request is set to begin processing on the printer. This allows the subsequent requestor to change printers or select a different date and time for the particular print job so that the particular print job is not in conflict with the original print job request, which was made by the original requestor.

One now appreciates how print jobs can be scheduled and guaranteed based on calendaring or scheduling techniques and print job estimations. This provides greater user independence and automation when using printing facilities and printing resources.

It is noted that for improved automation and in some other embodiments, the print data can be converted into printer driver format for purposes of acquiring an estimation needed to process the print job request on the print data (as was discussed above at 111-113). However, in these cases the converted print data and its printer driver format (such as raster image) can be maintained in storage in a location local to or accessible to the printer that is eventually scheduled to process the print data. So, when the print job request actually is set to process there is no need to convert the print data into the printer driver format, since that has already been done. Such a scenario can further improve processing efficiency and throughput.

Figure 2:
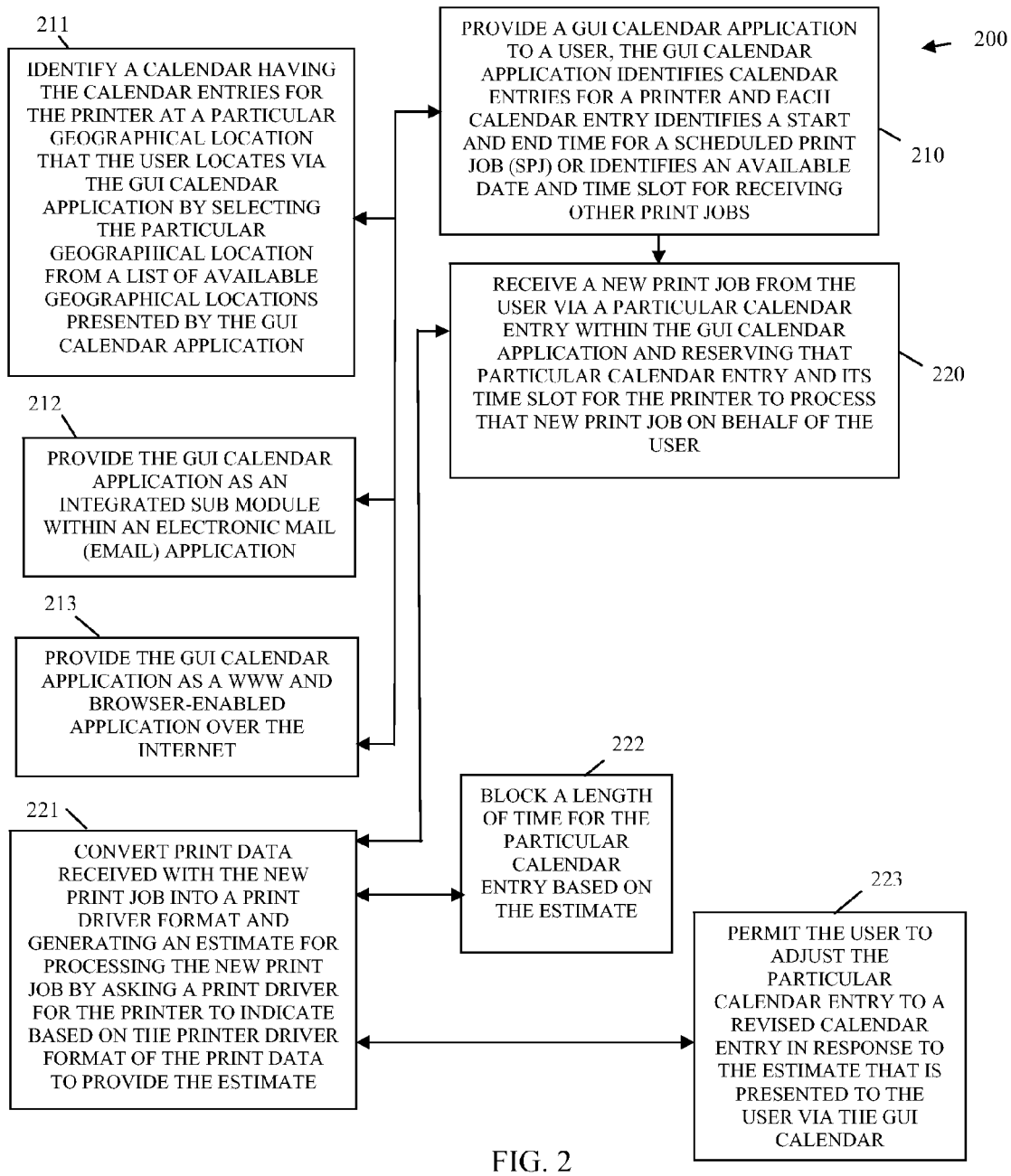
FIG. 2 is a diagram of another method for scheduling a print job, according to an example embodiment.

FIG. 2 is a diagram of another method 200 for scheduling a print job, according to an example embodiment. The method 200 (herein after referred to as "print manager") is implemented in a machine-accessible and computer-readable storage medium as instructions, which when accessed by one or more machines (processors, etc.) perform the processing depicted in the FIG. 2; the print manager is also operational over a network; and the network may be wired, wireless, or a combination of wired and wireless.

The print manager presents another and in some cases enhanced perspective of the printer scheduler represented by the method 100 of the FIG. 1 and discussed above.

At 210, the print manager provides a GUI calendar application to a user. The GUI calendar application identifies calendar entries for a printer and each calendar entry identifies a start and end time for a scheduled print job or identifies an available date and time slot for receiving other print jobs. Here, the calendar application is maintaining calendar entries or a schedule for the printer. The print manager provides or presents the GUI calendar application to the user on behalf of the printer.

According to an embodiment, at 211, the print manager identifies a calendar having the calendar entries for the printer based on a particular geographical location, which the user locates via the GUI calendar application by selecting that particular geographical location from a list of available geographical locations presented by the GUI calendar application. Essentially, the GUI calendar application lets a user select a particular geographical location for the printer or set of printers for which a calendar is maintained and that calendar along with its calendar entries are presented to the user for selection and manipulation via the GUI calendar application.

In another case, at 212, the print manager provides the GUI calendar application as an integrated sub module within an electronic mail (email) application or system. So, the GUI calendar application is a software service that executes on a processor as a set of instructions via the print manager and that software service is an integrated component of an email client or system. This can be an enhancement to existing email systems or can be a part of a new and custom email system.

In still another situation, at 213, the print manager provides the GUI calendar application as a World-Wide Web (WWW) and browser-enabled application over the Internet. So, the GUI calendar application is web enabled and accessible via browser pages to the user from any device and any location where an Internet connection can be established and where a browser application can be executed.

It is noted that a combined embodiment is also capable. That is the GUI calendar application can be integrated into a web-based and browser-enabled email system.

At 220, the print manager receives a new print job from the user via a particular calendar entry selection from within the GUI calendar application. That calendar entry is then received at its time slot for the printer to process the new print job on behalf of the user on the designated date and time identified within the calendar entry.

According to an embodiment, at 221, the print manager converts print data received with the new print job into a print driver format. Next, an estimate is generated for processing the new print job by asking a print driver for the printer to indicate based on the printer driver format of the print data to provide the estimate. That is, the print data is placed in a raster format for the printer and that printer's print driver examines that raster format for its complexity and size and provides back an estimated time for the printer to complete printing the print data.

Continuing with the embodiment at 221 and at 222, the print manager blocks a length of time for the particular calendar entry based on the estimate. So, the user selects a start date and time via the calendar entry and that calendar entry is extended from the state date and time for a length of time that is commensurate with the estimate. For example, suppose the user says print the print job on Jan. 1, 2010 at 10 am and the printer driver estimates it will take an hour for the printer to print. The print manager then blocks a calendar entry from 10 am to 11 am on Jan. 1, 2010 for that print job and no other print jobs will be accepted for the printer during this time of 10-11 am or will be accepted if they start before 10 am and will likely run (based on estimates for them) past 10 am.

In another case of 221 and at 223, the print manager permits the user to adjust the particular calendar entry to a revised calendar entry in response to the estimate. That is, the print manager at the time the user books the print job via the calendar entry on the calendar notifies the user of the estimate and based on this estimate the user can adjust the calendar entry so the user is assured that the print job is completed at a desired time by the user. So, in the previous example, the user can revise the calendar entry to 9 am on Jan. 1, 2010 if the user needs the print job completed by 10 am on Jan. 1, 2010 when the estimate needed to complete the print job by the printer is 1 hour.

Figure 3:
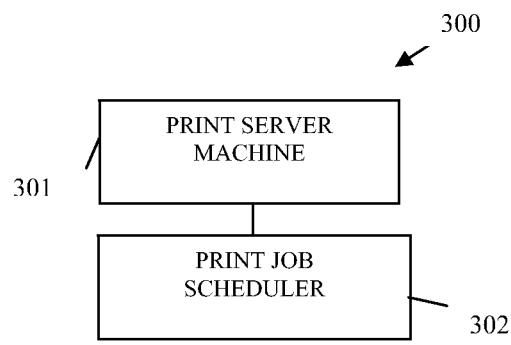
FIG. 3 is a diagram of a print job scheduling system, according to an example embodiment.

FIG. 3 is a diagram of a print job scheduling system 300, according to an example embodiment. The print job scheduling system 300 is implemented in a machine-accessible and computer-readable storage medium as instructions, which when executed by one or more machines (computers or processor-enabled devices) perform, among other things, the processing depicted in the methods 100 and 200 of the FIGS. 1 and 2, respective. The print job scheduling system 300 is also operational over a network; the network may be wired, wireless, or a combination of wired and wireless.

The print job scheduling system 300 includes a print server machine 301 and a print job scheduler 301. Each of these components and their interactions with one another will now be discussed in turn.

The print server machine 301 is enabled over the network to manage the printer or one or more other printers. In an embodiment, the methods 100 and 200 of the FIGS. 1 and 2, respectively, process or execute on the print server machine 301. That is, the print server machine 301 is specifically configured, in some embodiments, to execute the methods 100 and 200 of the FIGS. 1 and 2, respectively.

The print job scheduler 302 is implemented in a computer-readable storage medium and is executed by the printer server machine 301. Example processing associate with the print job scheduler 302 was presented in detail above with reference to the methods 100 and 200 of the FIGS. 1 and 2, respectively.

During operation, the print job scheduler 302 manages a print job schedule for the printer that the print server machine 301 handles. The print job scheduler 302 holds print jobs in abeyance for execution by the printer until designated dates and start times are reached for those print jobs. The print job scheduler 302 manages a print queue for the printer to ensure that the printer does not begin to process any particular print job when that particular print job cannot be assured of completing before a scheduled start time of one of the print jobs being held in abeyance for execution by the printer.

So, the print job scheduler 302 will not let print jobs be placed in the print queue of the printer if those print jobs cannot be completed before a scheduled start time of a print job being held in abeyance. If for some unexpected reason a print job is processing when a scheduled print job being held in abeyance is scheduled to print, then the print job scheduler 302 can immediately cancel the print job being processed from the printer so as to ensure the scheduled print job starts at its scheduled start time.

According to an embodiment, the print job schedule is identified via a GUI as a calendar for the printer and the GUI calendar is presented to a user via a GUI calendar application, such as what was discussed above with reference to the method 200 of the FIG. 2.

In some cases, the calendar identifies the printer and a specific geographical location for that printer. So, the calendar in some cases represents the print schedule for a given printer and its geographical location.

In another situation, the print job schedule visually depicts to the user calendar entries for the calendar. Each calendar entry shows a start and a completion time for a scheduled print job of the printer.

In another embodiment, the print job scheduler permits requestors to submit print data with requested print jobs to receive estimates as to how long the requested print jobs are to take to process on the printer when those requested print jobs are started on the printer. Again, these scenarios were presented in detail above with reference to the methods 100 and 200 of the FIGS. 1 and 2, respectively.

In yet another case, the print job scheduler 302 permits requestors to revise requested start times for the requested print jobs in response to the estimates presented to the requestors with the submitted print data. So, requestors can revise schedules and start times when the estimates warrant such revisions based on the opinion of the requestors.

Figure 4:
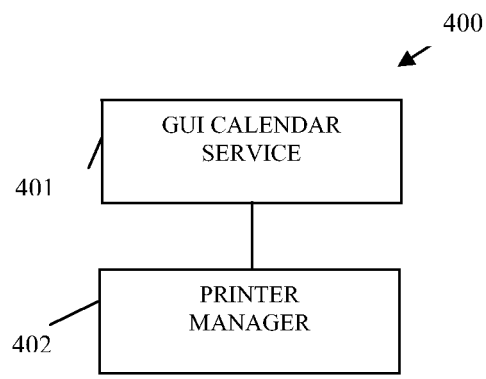
FIG. 4 is a diagram of another print job scheduling system, according to an example embodiment.

FIG. 4 is a diagram of another print job scheduling system 400, according to an example embodiment. The print job scheduling system 400 is implemented as instructions on or within a machine-accessible and computer-readable storage medium. The instructions when executed by one or more machines (processor-enabled devices) perform, inter alia; the processing depicted with respect to the methods 100, 200 of the FIGS. 1-2, respectively, and the system 300 of the FIG. 3. The print job scheduling system 400 is also operational over a network and the network may be wired, wireless, or a combination of wired and wireless.

The print job scheduling system 400 is another and in some cases enhanced perspective to the print job scheduling system 300 represented by the FIG. 3 and presented above.

The print job scheduling system 400 includes a GUI calendar service 401 and a printer manager 402. Each of these components and their interactions with one another will now be discussed in turn.

The GUI calendar service 401 is implemented in a computer-readable storage medium and executes on a processor of the network. Example aspects of the GUI calendar service 401 were presented above with reference to the method 200 of the FIG. 2.

The GUI calendar service 401 is presented to a user and provides a calendar for a printer that is selected by that user. Each calendar entry identifies a particular start date and start time-of-day for a scheduled print job of the printer and each calendar entry identifies available dates and times for new print jobs to be potentially processed on the printer.

The printer manager 402 is implemented in a computer-readable storage medium and executes on the same processor as the GUI calendar service 401 or on another entirely different processor of the network. Detailed processing associated with the printer manager 402 was presented in detail above with reference to the methods 100 and 200 of the FIGS. 1 and 2, respectively, and with respect to the system 300 of the FIG. 3.

The printer manager 402 interacts with the calendar of the GUI calendar service 401 to start print jobs for the printer at dates and times that are dictated by or defined within the calendar entries. Moreover, the printer manager 402 uses the calendar entries to deny subsequent print jobs that attempt to gain access to a print queue of the printer when those subsequent print jobs conflict with the scheduled print jobs. Details associated with how this is achieved were discussed in detail above with reference to the methods 100 and 200 of the FIGS. 1 and 2, respectively.

According to an embodiment, the printer manager 402 provides estimates as to how long each submitted print job is to take once started on the printer and uses these estimates to block out lengths of time for the calendar entries of the scheduled print jobs within the calendar.

Continuing with the previous embodiment, the printer manager 402 converts print data to a print driver format and then asks a print driver to supply the estimates based on the print data in the print driver format. Again, this scenario was discussed in detail above with reference to the methods 100 and 200 of the FIGS. 1 and 2, respectively.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium to process on a server and to perform the method, comprising:
  receiving, a print job request with print data from a requestor, the requestor is an automated service that provides automated interaction;
  identifying a future date and time requested for the print job request and made by the requestor; and
  assuring the requestor that the print job request is to execute on the future date and time after successful inspection of a schedule for a geographic location of other print jobs that are set to print on given dates and times, and ensuring that there are not any of the other print jobs that are submitted for processing to a specified printer that are to run past the future date and time for which the print job request is to start on the specified printer, and wherein the requestor guaranteed that the print job will execute on the future date and time without any interference, the schedule defined in a calendar for a specific printer at the geographical location and the calendar managed by a calendar system and entries within the calendar for the printer represents scheduled print jobs that are to be executed on the printer with each entry showing a start time and end time for a particular print job, and factoring into a determination for the end time an estimation for an amount of processing time to complete the particular print job on the specific printer at the start time.

2. The method of claim 1, wherein receiving further includes converting the print data into a printer driver format for purposes of estimating an amount of processing time that it is to take a printer to execute the print job request on the future date and time.

3. The method of claim 2, wherein converting further includes passing the print data to a printer driver to convert the print data into the printer driver format.

4. The method of claim 3 further comprising, notifying the requestor of the amount of processing time and indicating to the requestor that the print job request is to complete on the printer at a completion time that adds the amount of processing time to the future date and time.

5. The method of claim 1, wherein identifying further includes acquiring the future date and time via a graphical user interface selection made by the requestor that selects a particular calendar entry that identifies the future date and time.

6. The method of claim 1, wherein identifying further includes receiving a specific geographical location from the requestor as to where the print job request is to be processed on the future date and time.

7. The method of claim 1 further comprising, managing a print queue for a printer that is set to execute the print job request at the future date and time by ensuring that there are not any additional print jobs that are submitted for processing to the printer that are to run past the future date and time for which the print job request is to start on the printer.

8. The method of claim 7, wherein managing further includes notifying a subsequent requestor associated with a particular print job that the particular print job cannot begin to process on the printer at a selected time because an estimate for processing the particular print job puts a completion of that particular print job in conflict with the future date and time when the print job request is to begin on the printer.

* * * * *